US012784494B2

(12) United States Patent
Chen et al.

(10) Patent No.: US 12,784,494 B2

(45) Date of Patent: Nov. 3, 2026

(54) METHOD AND APPARATUS FOR SELECTING FACE IMAGE, DEVICE, AND STORAGE MEDIUM

(71) Applicant: TENCENT TECHNOLOGY (SHENZHEN) COMPANY LIMITED, Shenzhen (CN)

(72) Inventors: Xingyu Chen, Shenzhen (CN); Ruixin Zhang, Shenzhen (CN); Tao Wang, Shenzhen (CN); Shaoxin Li, Shenzhen (CN); Yuan Huang, Shenzhen (CN); Pan Cheng, Shenzhen (CN); Guangyuan Li, Shenzhen (CN); Sizheng Yang, Shenzhen (CN); Jilin Li, Shenzhen (CN); Yongjian Wu, Shenzhen (CN); Feiyue Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 575 days.

(21) Appl. No.: 17/964,730

(22) Filed: Oct. 12, 2022

(65) Prior Publication Data

US 2023/0030267 A1 Feb. 2, 2023

Related U.S. Application Data

(63) Continuation of application No. PCT/CN2021/107182, filed on Jul. 19, 2021.

(30) Foreign Application Priority Data

Aug. 25, 2020 (CN) ......................... 202010863256.0

(51) Int. Cl.

*G06V 40/16* (2022.01)
*G06V 10/74* (2022.01)
(Continued)

(52) U.S. Cl.

CPC .......... *G06V 40/161* (2022.01); *G06V 10/761* (2022.01); *G06V 10/774* (2022.01);
(Continued)

(58) Field of Classification Search

CPC ............... G06V 40/161; G06V 40/168; G06V 40/172; G06V 40/16; G06V 40/171;
(Continued)

(56) References Cited

U.S. PATENT DOCUMENTS

2017/0076146 A1* 3/2017 Saripalle .............. G06V 10/993
2018/0352150 A1* 12/2018 Purwar ................... G06T 7/536
(Continued)

FOREIGN PATENT DOCUMENTS

CN 108171256 A * 6/2018 ........... G06F 18/214
CN 108509969 A * 9/2018 ........... G06F 18/214
(Continued)

OTHER PUBLICATIONS

Espacenet English Translation of CN-109215010-A Description (Year: 2019).*
(Continued)

*Primary Examiner* — Sumati Lefkowitz
*Assistant Examiner* — Anthony J Rodriguez
(74) *Attorney, Agent, or Firm* — ANOVA LAW GROUP, PLLC

(57) ABSTRACT

This application discloses a method and an apparatus for selecting a face image, a device, and a storage medium and relates to the field of artificial intelligence technologies. The method includes detecting, after a frame of face image is obtained, whether the face image meets a preliminary quality screening condition; determining, in response to a first face image meeting the preliminary quality screening condition, an overall quality score of the first face image, the overall quality score representing overall quality of the face
(Continued)

image; and transmitting the first face image to a face recognition process in response to the overall quality score of the first face image being greater than a level-one threshold.

15 Claims, 10 Drawing Sheets

(51) Int. Cl.
*G06V 10/774* (2022.01)
*G06V 10/82* (2022.01)
*G06V 10/98* (2022.01)

(52) U.S. Cl.
CPC ............ *G06V 10/82* (2022.01); *G06V 10/987* (2022.01); *G06V 10/993* (2022.01); *G06V 40/168* (2022.01); *G06V 40/172* (2022.01)

(58) Field of Classification Search
CPC ........ G06V 10/993; G06T 2207/30201; G06T 2207/30168
See application file for complete search history.

(56) References Cited

U.S. PATENT DOCUMENTS

| | | | | |
|---|---|---|---|---|
| 2019/0065906 | A1 | 2/2019 | Weng et al. | |
| 2020/0302715 | A1* | 9/2020 | Tulsidas | G06F 18/28 |
| 2020/0411165 | A1* | 12/2020 | Torii | G06T 11/60 |
| 2021/0374447 | A1* | 12/2021 | Liu | G06T 5/20 |

FOREIGN PATENT DOCUMENTS

| | | | | | |
|---|---|---|---|---|---|
| CN | 109215010 | A | * | 1/2019 | G06F 18/22 |
| CN | 110263680 | A | * | 9/2019 | G06T 7/0002 |
| CN | 110298310 | A | | 10/2019 | |
| CN | 110826519 | A | | 2/2020 | |
| CN | 110837750 | A | * | 2/2020 | G06F 18/214 |
| CN | 111738243 | A | | 10/2020 | |
| CN | 110837750 | B | * | 11/2023 | G06F 18/214 |

OTHER PUBLICATIONS

Espacenet English Translation of CN-110837750-B Description (Year: 2018).*
Yoon Y-J et al., A New Human Perception-Based Over-Exposure Detection Method for Color Images, 2014, MDPI (Year: 2014).*
Espacenet English Translation of CN-110263680-A Description (Year: 2019).*
Espacenet English Translation of CN-108171256-A Description (Year: 2018).*
Espacenet English Translation of CN-108509969-A Description (Year: 2018).*
Da Pan et al., "Blind Predicting Similar Quality Map for Image Quality Assessment", CVPR2018, Beijing, China.
Kialei Liu et al., "RankIQA: Learning from Rankings for No-reference Image Quality Assessment", Jul. 2017, ICCV2017.
Philipp Terhorst et al. "SER-FIQ: Unsupervised Estimation of Face Image Quality Based on Stochastic Embedding Robustness", Mar. 2020, CVPR2020.
Lacey Best-Rowden et al. "Learning face image quality from human assessments", Jan. 2018, TIFS2018.
Yichun Shi et al. "Probabilistic Face Embeddings", 2019, ICCV2019.
The World Intellectual Property Organization (WIPO) International Search Report for PCT/CN2021/107182 Oct. 15, 2021 8 Pages (including translation).

* cited by examiner

METHOD AND APPARATUS FOR SELECTING FACE IMAGE, DEVICE, AND STORAGE MEDIUM

RELATED APPLICATIONS

This application is a continuation application to PCT Application No. PCT/CN2021/107182, filed on Jul. 19, 2021, which in turn claims priority to Chinese Patent Application No. 202010863256.0, filed on Aug. 25, 2020 and entitled "METHOD AND APPARATUS FOR SELECTING FACE IMAGE, DEVICE, AND STORAGE MEDIUM". The two applications are both incorporated by reference in their entirety.

FIELD OF THE TECHNOLOGY

This application relates to the field of artificial intelligence technologies, and in particular, to a method and an apparatus for selecting a face image, a device, and a storage medium.

BACKGROUND OF THE DISCLOSURE

With the research and progress of artificial intelligence technologies, the artificial intelligence technologies are applied in many fields.

Face recognition is a biometric recognition technology of performing identity recognition based on feature information of a human face, and is an important part of the artificial intelligence technologies. Before face recognition detection, it is often necessary to go through a face selection process. Usually, a device buffers a fixed quantity of frames of face images, and selects an image with better quality as an object of the face recognition.

The conventional face selection method is time-consuming and inflexible.

SUMMARY

Embodiments of this application provide a method and an apparatus for selecting a face image, a device, and a storage medium, which can effectively reduce time required for a face selection process and improve flexibility of the face selection process.

One aspect of an embodiment of this application provides a method for selecting a face image. The method includes detecting, after a frame of face image is obtained, whether the face image meets a preliminary quality screening condition; determining, in response to a first face image meeting the preliminary quality screening condition, an overall quality score of the first face image, the overall quality score representing overall quality of the face image; and transmitting the first face image to a face recognition process in response to the overall quality score of the first face image being greater than a level-one threshold.

Another aspect of an embodiment of this application provides a computer device. The computer device includes a processor and a memory, the memory storing at least one instruction, at least one program, a code set, or an instruction set, and the at least one instruction, the at least one program, the code set, or the instruction set being loaded and executed by the processor to implement the foregoing method for selecting a face image.

Another aspect of an embodiment of this application provides a non-transitory computer-readable storage medium, the computer storage medium storing at least one instruction, at least one program, a code set, or an instruction set, the at least one instruction, the at least one program, the code set, or the instruction set being loaded and executed by a processor to implement the foregoing method for selecting a face image.

In embodiments of the present disclosure a face image is preliminarily screened by a frame-by-frame detection instead of rigidly filtering several frames of face images, and an overall quality score is determined only when the preliminary screening is qualified, to improve flexibility of a face selection process. In addition, it is accurately determined, according to the preliminary quality screening, whether an automatic exposure adjustment state ends. After the automatic exposure adjustment state ends, quality of the face image may be determined. Compared with the systems in which the quality of the face image starts to be determined after mechanically waiting for several frames of face images, more than a half of time consumptions can be reduced. In addition, when overall quality of the face image is qualified, the face image may be transmitted to a face recognition process, which effectively reduces time required for the face selection process, thereby helping to shorten the time consumed in the face recognition process, and improving user experience.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application. A person of ordinary skill in the art may still derive other drawings according to these accompanying drawings without creative efforts.

DESCRIPTION OF EMBODIMENTS

To make objectives, technical solutions, and advantages of this application clearer, the following further describes implementations of this application in detail with reference to the accompanying drawings.

Figure 1:
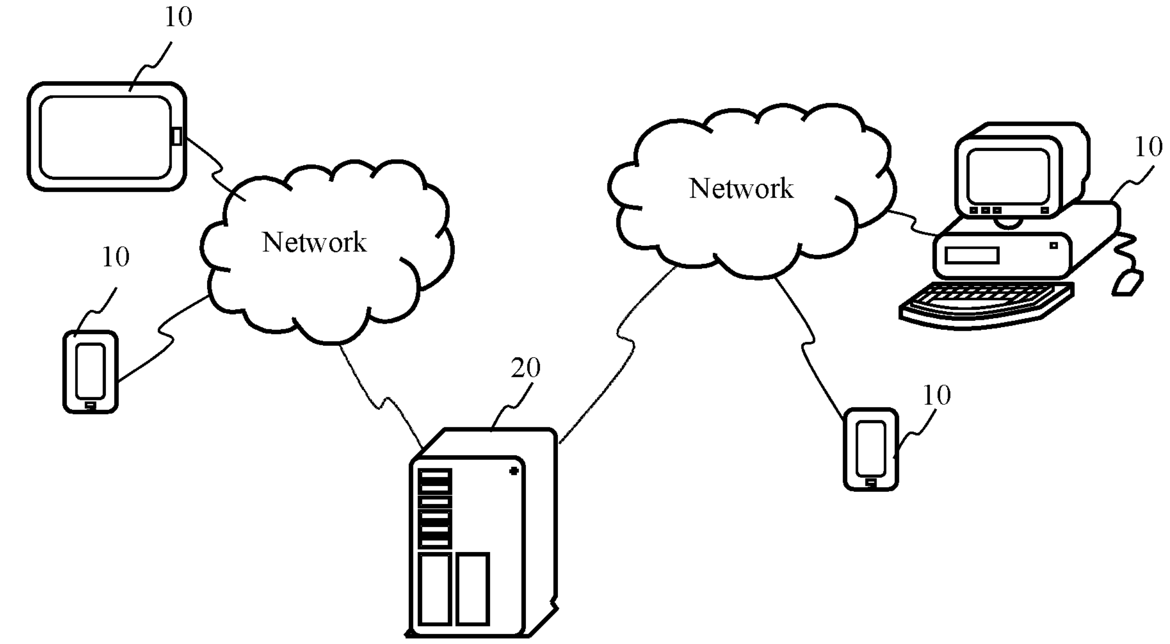
FIG. 1 is a schematic diagram of an application operating environment according to an embodiment of this application.

FIG. 1 shows a schematic diagram of a solution implementation environment according to an embodiment of this application. The solution implementation environment may be implemented as a face recognition system. The solution implementation environment may include a terminal 10 and a server 20.

The terminal 10 may be an electronic device such as a mobile phone, a tablet computer, a multimedia player, a wearable device, a personal computer (PC), a face payment terminal, a face check-in terminal, or a smart camera. The terminal 10 may be configured with or connected to a camera, and acquire face video data through the camera. A client on which an application is run may be installed on the terminal 10, and the application may include a face recognition function. In the embodiments of this application, a type of the application is not limited. For example, the application may be a social application, a payment application, a monitoring application, an instant messaging application, a video application, a news information application, a music application, or a shopping application.

The server 20 may be an independent physical server, or may be a server cluster composed of a plurality of physical servers or a distributed system, or may be a cloud server that provides cloud computing services. The server 20 may be a backend server of the foregoing application, and configured to provide background services for the application.

The terminal 10 may communicate with the server 20 by using a network. This application is not limited herein.

In the method for selecting a face image provided by the embodiments of this application, each step may be performed by the server 20 or the terminal 10 (such as the client on which the application is run in the terminal 10), or each step may be performed by the terminal 10 and the server 20 interactively and cooperatively. For ease of description, in the following method embodiments, a description is made by using only an example in which each step is performed by a computer device, but this application is not limited thereto.

In an example, face recognition payment is taken as a typical example for description. An application scenario of the face recognition payment includes, but not limited to, a self-service terminal payment scenario, a mobile terminal payment scenario, and an unmanned retail store scenario. In the self-service terminal payment scenario, the foregoing method is applicable to a cashier device installed in a place such as a large commercial complex, a supermarket, a gasoline station, a hospital, a self-service vending machine, or a campus. In the mobile terminal payment scenario, the foregoing method is applicable to a mobile terminal such as a smart phone or a wearable device. In the unmanned retail store scenario, the foregoing method is to be applicable to a terminal of an unmanned retail store. By adding a face payment channel in a payment process, a user may complete the payment by face recognition, to reduce time spent on queuing for checkout, and greatly improve user experience.

With the research and progress of artificial intelligence technologies and cloud technologies, the artificial intelligence technologies and the cloud technologies are researched and applied in many fields. A terminal in the foregoing face recognition environment such as the face recognition payment terminal may be connected to a cloud platform through a network. The terminal is further provided with a face selection module trained based on the artificial intelligence (AI) technologies. The face selection module may perform the method for selecting a face image provided in this application, to achieve quick face image selection.

Figure 2:
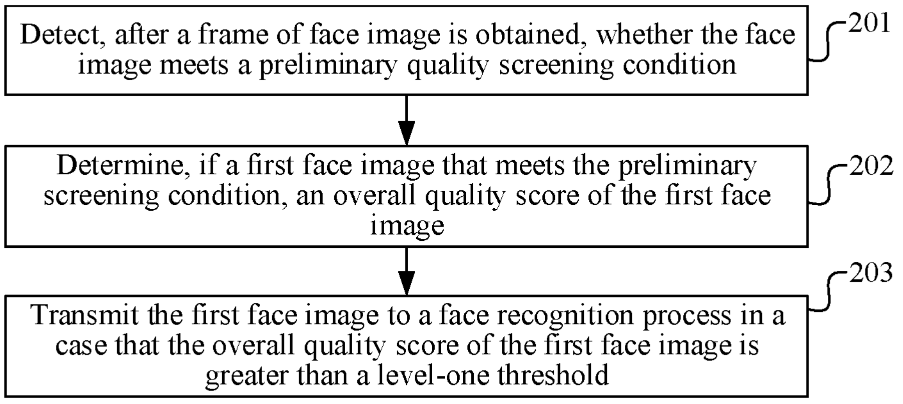
FIG. 2 is a flowchart of a method for selecting a face image according to an embodiment of this application.

FIG. 2 is a flowchart of a method for selecting a face image according to an embodiment of this application. The method may include the following steps (201 to 203).

Step 201. Detect, after a frame of face image is obtained, whether the face image meets a preliminary quality screening condition.

For example, after each time a frame of face image is obtained, it is detected whether the face image meets the preliminary quality screening condition. That is, each time a frame of face image is obtained, preliminary quality screening is performed on the frame of face image, to realize frame-by-frame detection on preliminary quality.

The face image is a to-be-detected image including a human face. In some embodiments, the face image may be obtained from a face video stream, and one image frame in the face video stream corresponds to one face image. In some embodiments, the face image is an image frame in the face video stream, or the face image is a partial image region including a human face in an image frame. In some embodiments, the face video stream may be acquired by using the computer device.

The preliminary quality screening condition, as a basis for preliminarily screening the face image, is a condition used for preliminarily determining face image quality. In an initial stage of face image acquisition, a face image acquisition device such as a camera or a camera in a terminal often requires an automatic exposure (AE) adjustment process, so that the face image has a good brightness effect. The automatic exposure is that the camera automatically adjusts the exposure according to light intensity to prevent overexposure or underexposure. The automatic exposure realizes an appreciative brightness level or a so-called target brightness level in different lighting conditions and scenarios by adjusting a lens aperture, sensor exposure time, a sensor analog gain, and a sensor/image signal processing (ISP) digital gain, so that a captured video or image is neither too dark nor too bright. However, face images acquired in the automatic exposure adjustment process are of poor quality due to the brightness problem. Therefore, the face image acquired in the automatic exposure adjustment process is usually not selected as an image for face recognition, to avoid affecting accuracy of face recognition. The preliminary quality screening condition is set, so that the face image acquired in the automatic exposure adjustment process may be filtered out, and then a face image after the automatic exposure adjustment process ends is obtained through screening, to reduce a calculation amount of a subsequent face image screening step.

Step 202. Determine, when a first face image that meets the preliminary quality screening condition is detected, an overall quality score of the first face image.

For example, the first face image includes a face image corresponding to a first image frame that meets the preliminary quality screening condition in the face video stream, for example, a first frame of face image acquired after the automatic exposure adjustment process ends.

The overall quality score is used for representing overall quality of the face image. In some embodiments, the overall quality score is positively correlated with the overall quality of the face image. A higher overall quality score corresponds to better overall quality of the face image.

Step 203. Transmit the first face image to a face recognition process when the overall quality score of the first face image is greater than a level-one threshold.

The level-one threshold is a preset value, and is used as a basis for determining whether to transmit the first face image to the face recognition process. If the overall quality score of the first face image is greater than the level-one threshold, it means that the overall quality of the first face image is good and meets a quality requirement for being used for face recognition. The first face image may be used as an image for the face recognition, that is, may be transmitted to the face recognition process. The level-one threshold may be set according to use scenarios and according to experience or experimental data. A value of the level-one threshold and a basis for value setting are not limited in this embodiment of this application. The face recognition is a biometric recognition technology of performing identity recognition based on feature information of a human face.

In some embodiments, the method for selecting a face image provided in this embodiment of this application is applicable to various scenarios involving face quality assessment, including, but not limited to, a plurality of application scenarios such as face recognition payment, camera imaging quality review, and identity photo quality review. In some embodiments, the content is described only by using the face recognition payment as an example. In a face recognition payment process, a face recognition payment scenario may be classified into three types according to a degree of user cooperation: a cooperative scenario, a semi-cooperative scenario, and a non-cooperative scenario. The cooperative scenario means that most users are in a normal cooperative state during paying. Therefore, a face image acquired by a payment device is of relatively good quality and may be used as an image for face recognition. The semi-cooperative scenario is a scenario in which overall quality of a face image acquired when the user performs payment is not good in some scenarios due to environmental or force majeure factors. The non-cooperative scenario is a scenario in which the user performs face recognition payment in a non-cooperative state such as wearing sunglasses or turning a head by an excessively large angle. In this case, the level-one threshold is set as a basis for determining whether the face recognition payment scenario is the cooperative scenario, so that only once determining is required, that is, whether overall quality score of a face image is greater than the level-one threshold, and the face recognition payment scenario may be determined. If the overall quality score of the face image is greater than the level-one threshold, it may be determined that the user performs face recognition payment in the cooperative scenario. In this case, the acquired face image may be transmitted to the face recognition process for face recognition detection, to ensure that face images of most users are qualified once, and shorten time consumed in the face image selection process.

In some embodiments, when the overall quality score of the first face image is equal to the level-one threshold, the first face image is transmitted to the face recognition process. That is, in an implementation of this application, a processing manner in which the overall quality score of the first face image is equal to the level-one threshold is the same as the processing manner in which the overall quality score of the first face image is greater than the level-one threshold. In another implementation of this application, the processing manner in which the overall quality score of the first face image is equal to the level-one threshold is the same as the processing manner in which the overall quality score of the first face image is less than the level-one threshold. In a subsequent step of comparing with a threshold, when a compared score is equal to the threshold, the processing manner may refer to the processing manner in which the score is greater than the threshold, or may refer to the processing manner in which the score is less than the threshold. This is not limited in this application.

Figure 3:
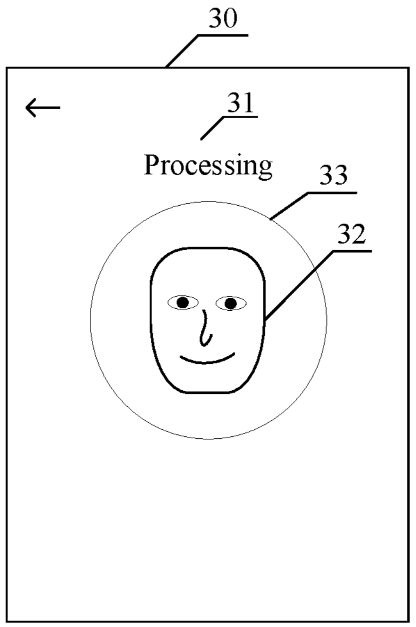
FIG. 3 is a schematic diagram of an interface of transmitting a first face image to a face recognition process.

In an example, FIG. 3 is an exemplary schematic diagram of an interface of transmitting a first face image to a face recognition process. Prompt information 31 of face recognition processing and a first face image 32 are displayed in a display interface 30. In some embodiments, before the first face image is transmitted to the face recognition process, a dynamic face video stream (not shown in the figure) is displayed in a circular face image display region 33. When the first face image is transmitted to the face recognition process, the first face image 32 is statically displayed in the circular face image display region 33.

In one embodiment, after step 203, the following steps are further included.

Step 204. Stop a face screening process when the overall quality score of the first face image is less than a level-two threshold and display prompt information.

The level-two threshold is a preset value, and is used as a basis for determining whether to stop the face screening process. The level-two threshold is less than the level-one threshold. If the overall quality score of the first face image is less than the level-two threshold, it means that the overall quality of the first face image is poor and cannot meet the quality requirement for being used for face recognition, that is, the face screening process may be stopped. The level-two threshold may be set according to use scenarios and according to experience or experimental data. A value of the level-two threshold and a basis for value setting are not limited in this embodiment of this application. Similarly, the content is described herein by using the face recognition payment as an example. By setting the level-two threshold as a basis for determining whether the face recognition payment scenario is the non-cooperative scenario, a low-quality face image may be effectively intercepted. In one application process of the face recognition payment, the level-two threshold is often relatively low and related to illegal malicious network attacks. By setting the level-two threshold, a picture carried by these malicious network attacks may be effectively intercepted, or a low-quality face image of a user acquired in a non-cooperative state may be effectively intercepted. In some embodiments, the level-two threshold may alternatively be equal to the level-one threshold.

Figure 4:
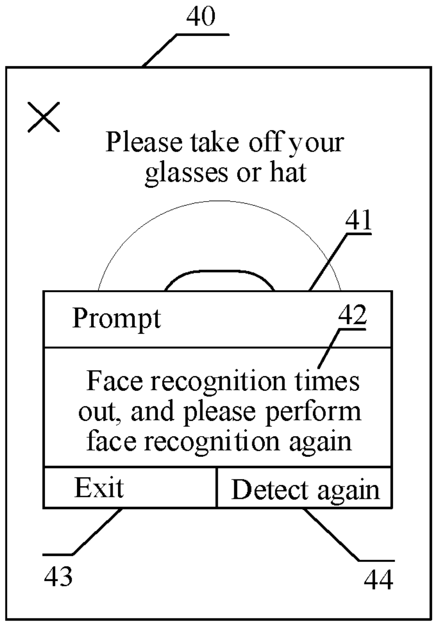
FIG. 4 is a schematic diagram of an interface of displaying prompt information when a face screening process is stopped.

The prompt information is used for prompting the user that the computer device needs to reobtain the face image, and prompting the user that the face screening process is stopped in this case. In an example, FIG. 4 is an exemplary schematic diagram of an interface of displaying prompt information when a face screening process is stopped. In a display interface 40, a prompt information box 41 is displayed. Information content 42 that prompts that the face screening process is stopped is displayed in the prompt information box. The prompt information box 41 further includes an exit control 43 and a re-detection control 44.

Based on the foregoing, in the technical solution provided by this embodiment of this application, a face image is preliminarily screened by frame-by-frame detection instead of rigidly filtering out previous several frames of face images, and an overall quality score is determined only when the preliminary screening is qualified, to improve flexibility of a face selection process. In addition, it is accurately determined, according to the preliminary quality screening, whether an automatic exposure adjustment state ends. After the automatic exposure adjustment state ends, quality of the face image may be determined. Compared with the related art in which the quality of the face image starts to be determined after mechanically waiting for several frames of face images, more than a half of time consumptions can be reduced. When the overall quality of the face image is qualified, the face image may be transmitted to the face recognition process, which effectively reduces time required for the face selection, thereby helping to shorten the time consumed in the face recognition process, and improving user experience.

In addition, when the overall quality of the face image is unqualified, the face screening process is stopped, to effectively intercept the picture carried by these malicious network attacks or the low-quality face image of the user acquired in the non-cooperative state.

Figure 5:
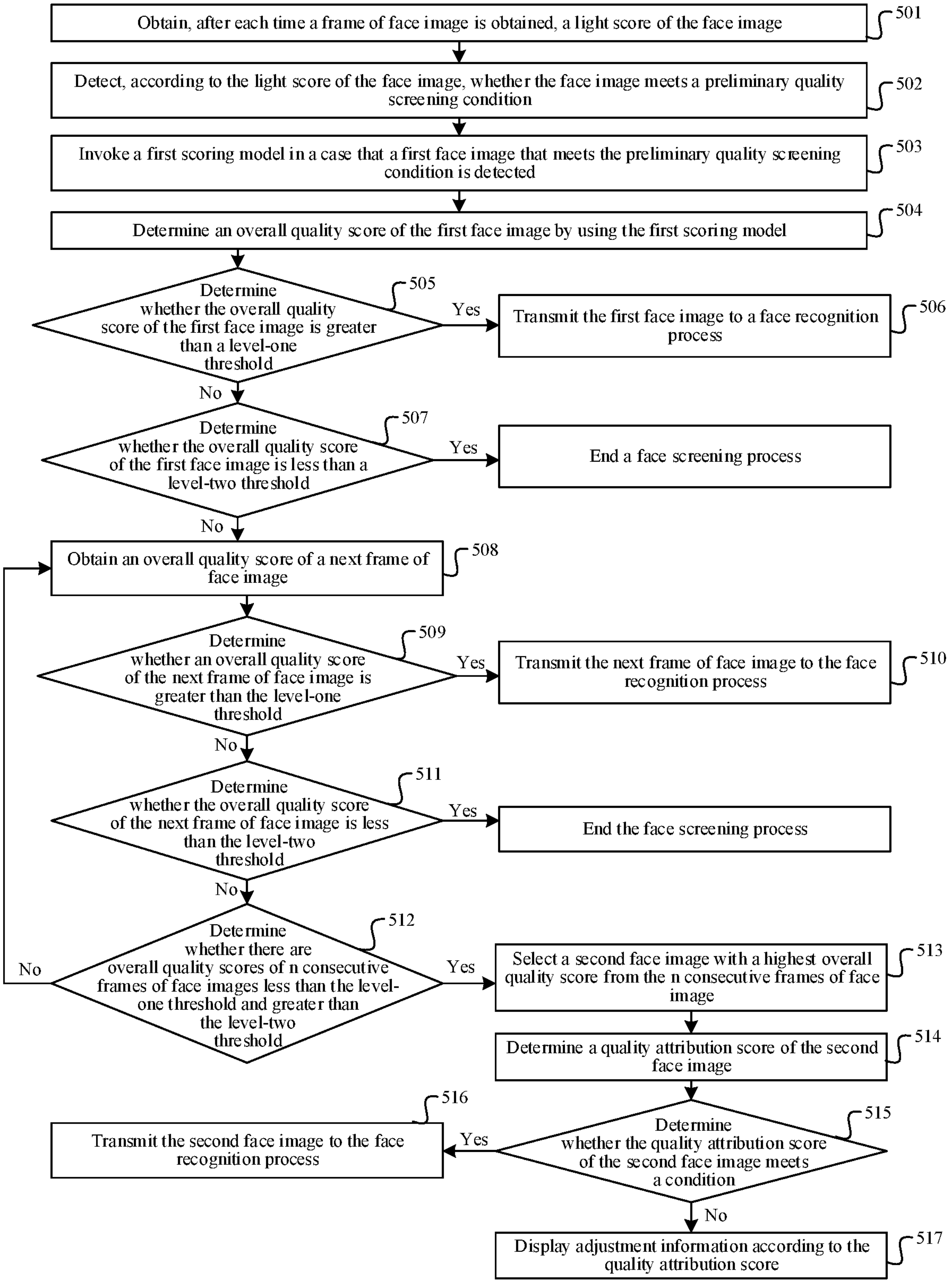
FIG. 5 is a flowchart of a method for selecting a face image according to another embodiment of this application.

FIG. 5 is a flowchart of a method for selecting a face image according to another embodiment of this application. The method may include the following steps (501 to 517).

Step 501. Obtain, after each time a frame of face image is obtained, a light score of the face image.

The light score is used for representing a brightness degree of the face image. In some embodiments, the light score is a basis for determining whether the automatic exposure adjustment process described in the foregoing embodiment ends.

Step 502. Detect, according to the light score of the face image, whether the face image meets a preliminary quality screening condition.

In some embodiments, whether the face image meets the preliminary quality screening condition is detected in an adaptive determining manner. In some embodiments, whether the face image meets the preliminary quality screening condition is detected by comparing the light score of the face image with a light score threshold. If the light score of the face image is greater than or equal to the light score threshold, the face image meets the preliminary quality screening condition. If the light score of the face image is less than the light score threshold, the face image does not meet the preliminary quality screening condition. The light score threshold is a preset value, and may be determined according to at least one of a parameter of automatic exposure, a parameter of an image acquisition device, or an environmental parameter. This is not limited in this embodiment of this application.

Figure 6:
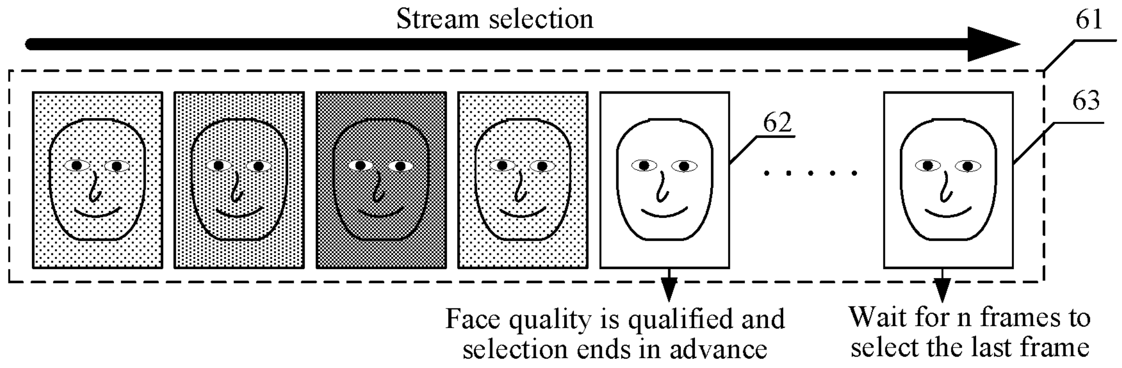
FIG. 6 is a schematic diagram of a preliminary screening process of a face image.

In some embodiments, step 501 and step 502 are a preliminary screening process of the face image. In an example, FIG. 6 is an exemplary schematic diagram of a preliminary screening process of a face image. In FIG. 6, A face video stream 61 is displayed. A sixth frame of face image 62 is a first frame of face image that meets the preliminary quality screening condition. In this case, it may be determined that the automatic exposure adjustment process of the face image acquisition device ends, and an overall quality score of the sixth frame of face image 62 may be detected. If the overall quality score of the sixth frame of face image 62 is greater than the level-one threshold, it may be determined that the quality of the face image is qualified, and the face selection process is ended in advance. However, a device usually waits for a $n^{th}$ frame 63, and starts the face selection process from a last frame. In this manner, the automatic exposure adjustment state of the face image acquisition device is not determined, leading to more time consumptions.

Step 503. Invoke a first scoring model when the first face image that meets the preliminary quality screening condition is detected.

The first scoring model is a neural network model configured to determine the overall quality score. In some embodiments, the first scoring model is a neural network model based on a residual network (ResNet) and combined with structures such as a squeeze-and-excitation network (SENet), group convolution, and an asymmetric convolutional network (ACNet).

The convolutional neural network based on the residual network is characterized in that the network is easy to optimize, and accuracy can be improved by increasing a corresponding depth. Residual blocks inside the convolutional neural network are in a skip connection, which alleviates a problem of gradient vanishing caused by increasing the depth in the deep neural network.

The group convolution is to group a feature map inputted by the convolutional neural network according to a channel, and then perform convolution on each group. Through the group convolution, a quantity of parameters in the neural network model may be effectively reduced, and a better model application effect may be obtained.

The asymmetric convolutional network is a convolutional neural network constructed by replacing a standard convolution block such as a 3*3 convolution block with an asymmetric convolution block (ACB). Specifically, for d*d convolution, an ACB including three parallel branches d*d, 1*d, and d*1 may be constructed, and outputs of the three branches are added together to enrich a feature space. The asymmetric convolutional network may improve accuracy and expressiveness of a model without introducing an additional parameter and increasing time consumed by calculation.

In some embodiments, when the first face image that meets the preliminary quality screening condition is detected, a gradient image corresponding to the first face image is obtained. The first scoring model is invoked, and the first face image and the gradient image corresponding to the first face image are inputted into the first scoring model. The gradient image is an image including gradient information of the first face image. In some embodiments, the image may be considered as a two-dimensional discrete function, and a gradient of the image is actually a derivation of the two-dimensional discrete function. In some embodiments, the first face image is processed through a Sobel operator, to obtain the gradient image corresponding to the first face image.

Step 504. Determine the overall quality score of the first face image by using the first scoring model.

The first face image is inputted into the first scoring model, and the overall quality score of the first face image is outputted by using the first scoring model.

In some embodiments, after the first face image is inputted into the first scoring model, the first scoring model obtains channel information of the first face image based on the first face image and a feature map corresponding to the first face image. In some embodiments, the first scoring model performs convolution processing based on the channel information of the first face image and the feature map corresponding to the first face image. In some embodiments, inputted content is processed by using an activation function such as a rectified linear unit (ReLU) in the first scoring model. In some embodiments, pooling processing is performed on inputted data by using the first scoring model. In some embodiments, after the first face image is processed by using the first scoring model, the overall quality score of the first face image is outputted.

In some embodiments, the first face image and the gradient image corresponding to the first face image are inputted into the first scoring model, and the overall quality score of the first face image is outputted by using the first scoring model. In this way, prior information of a gradient image corresponding to a face image is added when the face image and the gradient image are inputted into a model, which facilitates improving attention of the model to details of the face image, so that an outputted overall quality score of the face image is more accurate.

Figure 7:
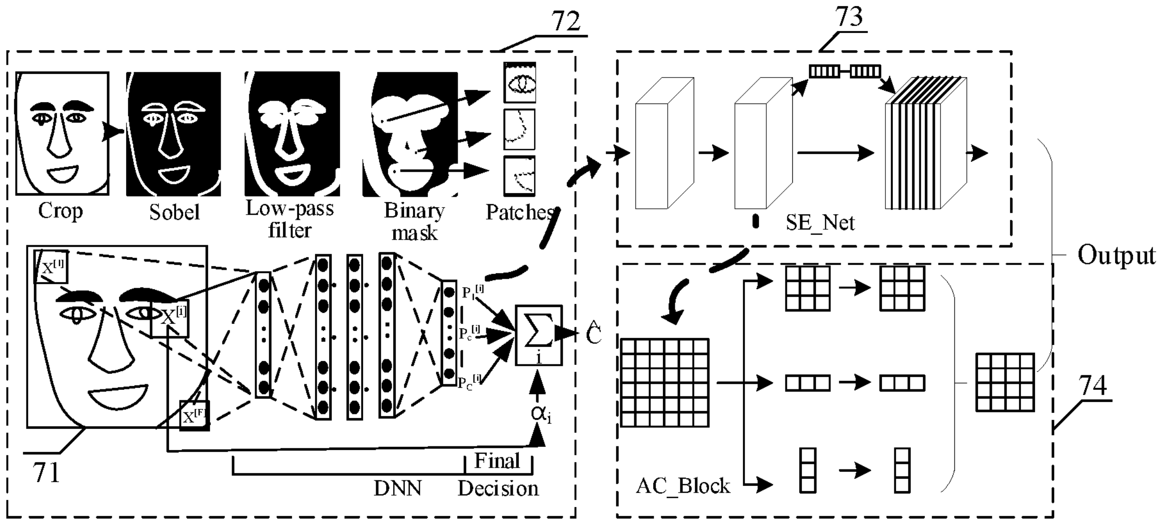
FIG. 7 is a schematic diagram of a process of determining an overall quality score through a first scoring model.

In an example, FIG. 7 is an exemplary schematic diagram of a process of determining an overall quality score by using a first scoring model. FIG. 7 shows a process 72 of performing gradient image prior on a face image 71, a network structure 73 combining a squeeze-and-excitation network, and a network structure 74 of an asymmetric convolutional network.

Step 505. Determine whether the overall quality score of the first face image is greater than a level-one threshold. If the overall quality score of the first face image is greater than the level-one threshold, step 506 is performed. If the overall quality score of the first face image is not greater than the level-one threshold, step 507 is performed.

Step 506. Transmit the first face image to a face recognition process.

Step 507. Determine whether the overall quality score of the first face image is less than a level-two threshold. If the overall quality score of the first face image is less than the level-two threshold, the face screening process ends. If the overall quality score of the first face image is not less than the level-two threshold, step 508 is performed.

Step 508. Obtain an overall quality score of a next frame of face image.

The initial next frame of face image is a next frame of face image of the first face image. In some embodiments, the next frame of face image is a face image corresponding to a next image frame of an image frame corresponding to a current face image in a face video stream.

In some embodiments, when the overall quality score of the first face image is less than the level-one threshold, the first face image is stored in a buffer area, and an overall quality score of a next frame of face image is obtained. The buffer area refers to a memory configured to temporarily place output or input data.

Step 509. Determine whether the overall quality score of the next frame of face image is greater than the level-one threshold. If the overall quality score of the next frame of face image is greater than the level-one threshold, step 510 is performed. If the overall quality score of the next frame of face image is not greater than the level-one threshold, step 511 is performed.

Step 510. Transmit the next frame of face image to the face recognition process.

Step 511. Determine whether the overall quality score of the next frame of face image is less than the level-two threshold. If the overall quality score of the next frame of face image is less than the level-two threshold, the face screening process ends. If the overall quality score of the next frame of face image is not less than the level-two threshold, step 512 is performed.

In some embodiments, when the overall quality score of the next frame of face image is less than the level-one threshold, the next frame of face image is stored in the buffer area, and execution is started from the operation of obtaining an overall quality score of a next frame of face image again.

In one embodiment, after step 511, the following steps are further included.

Step 512. Determine whether there are overall quality scores of n consecutive frames of face images less than the level-one threshold and greater than the level-two threshold. If there are the overall quality scores of the n consecutive frames of face images less than the level-one threshold and greater than the level-two threshold, step 513 is performed, and if there are no overall quality scores of n consecutive frames of face images less than the level-one threshold and greater than the level-two threshold, step S508 is performed again.

Step 513. Select a second face image with a highest overall quality score from the n consecutive frames of face images.

n is a positive integer greater than 1. In some embodiments, the value of n is a preset value, and may be set according to a specific use scenario. This is not limited in this embodiment of this application. For example, n is 5.

In some embodiments, step 512 and step 513 may also be implemented in the following manner: selecting, when overall quality scores of n frames of face images in the buffer area are less than the level-one threshold, the second face image with the highest overall quality score from the n frames of face images in the buffer area.

Step 514. Determine a quality attribution score of the second face image.

In this embodiment of this application, when there are the overall quality scores of the n consecutive frames of face images less than the level-one threshold, it is first determined whether the overall quality score of the second face image is greater than the level-two threshold, and then it is determined whether the quality attribution score meets a condition. In another embodiment, when there are the overall quality scores of the n consecutive frames of face images less than the level-one threshold, it may alternatively be determined first whether the quality attribution score of the second face image meets a condition, and then it is determined whether the overall quality score is greater than the level-two threshold.

For descriptions of the level-one threshold and the level-two threshold, reference is made to the content of the descriptions of the level-one threshold and the level-two threshold in the foregoing embodiment. Details are not described herein again. A situation in which the level-two threshold is less than the level-one threshold is described.

The quality attribution score includes quality scores in a plurality of quality reference dimensions, and reflects quality of a face image in the plurality of quality reference dimensions. Through the quality attribution score, it can be seen intuitively whether the face image is of good or bad quality in a quality reference dimension. The quality reference dimension is a reference component for measuring the quality of the face image, and is used for evaluating the quality of the face image in more detail. In some embodiments, the quality reference dimension includes at least one of an angle dimension, a blur dimension, a blocking dimension, or a light dimension.

In one embodiment, the process of determining the quality attribution score of the second face image in step 514 may be implemented by the following steps.

Step 514*a*. Invoke a second scoring model, where the second scoring model is a machine learning model configured to determine the quality attribution score.

The second scoring model is a neural network model configured to determine the quality attribution score. The structure of the second scoring model is similar to the structure of the first scoring model. For the structure of the second scoring model, reference may be made to the content of the first scoring model. Details are not described herein again.

Step 514*b*. Determine the quality attribution score of the second face image by using the second scoring model.

In some embodiments, the quality attribution score includes at least one of an angle score, a blur score, a blocking score, or a light score. The angle score is used for representing a face angle of the face image, the blur score is used for representing a blur degree of the face image, the blocking score is used for representing a blocking situation of the face image, and the light score is used for representing a brightness degree of the face image.

In some embodiments, the angle score, the blur score, the blocking score, and the light score have correlations with the image quality. The specific correlation, for example, a positive correlation or a negative correlation, may be formulated according to a use scenario. This is not limited in this embodiment of this application.

Step 515. Determine whether the quality attribution score of the second face image meets a condition. If the quality attribution score of the second face image meets the condition, step 516 is performed. If the quality attribution score of the second face image does not meet the condition, step 517 is performed.

Step 516. Transmit the second face image to the face recognition process.

In some embodiments, that the quality attribution score of the second face image meets the condition means that a quality attribution score of any item meets a condition corresponding to any item. An example in which the quality attribution score includes the angle score, the blur score, the blocking score, and the light score is used for description. That the quality attribution score of the second face image meets the condition means that the angle score, the blur score, the blocking score, and the light score all meet threshold conditions corresponding to the angle score, the blur score, the blocking score, and the light score. For example, the angle score meets an angle score threshold condition, and the blur score meets a blur score threshold condition, the blocking score meets a blocking score threshold condition, and the light score meets a light score threshold condition.

Figure 8:
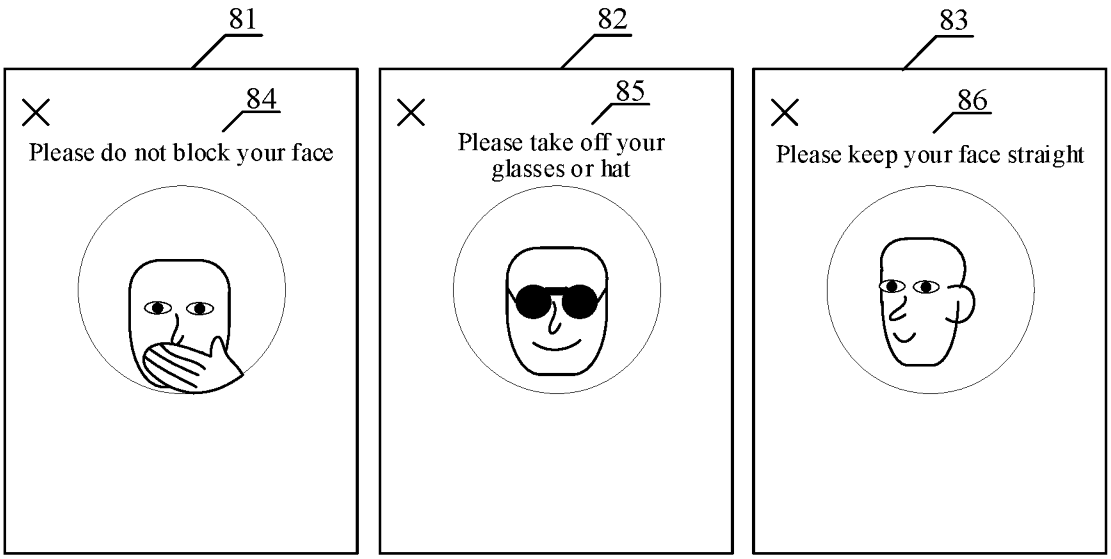
FIG. 8 is a schematic diagram of an interface of displaying adjustment information according to a quality attribution score.

Step 517. Display adjustment information according to the quality attribution score. That the quality attribution score of the second face image does not meet the condition means that a quality attribution score of any item does not meet the condition. For example, the quality attribution score includes the angle score, the blur score, the blocking score, and the light score. Provided that a score of one item does not meet a corresponding threshold condition, it may be determined that the quality attribution score of the second face image does not meet the condition. The adjustment information is information for prompting a user to make an adjustment to improve the quality of the face image. In an example, FIG. 8 is an exemplary schematic diagram of an interface of displaying adjustment information according to a quality attribution score. FIG. 8 shows three interfaces 81, 82, and 83 for displaying adjustment information. Content of adjustment information 84 displayed in the interface 81 is that please do not block your face. Content of adjustment information 85 displayed in the interface 82 is that please take off your glasses or hat. Content of adjustment information 86 displayed in the interface 83 is that please keep your face straight.

Figure 9:
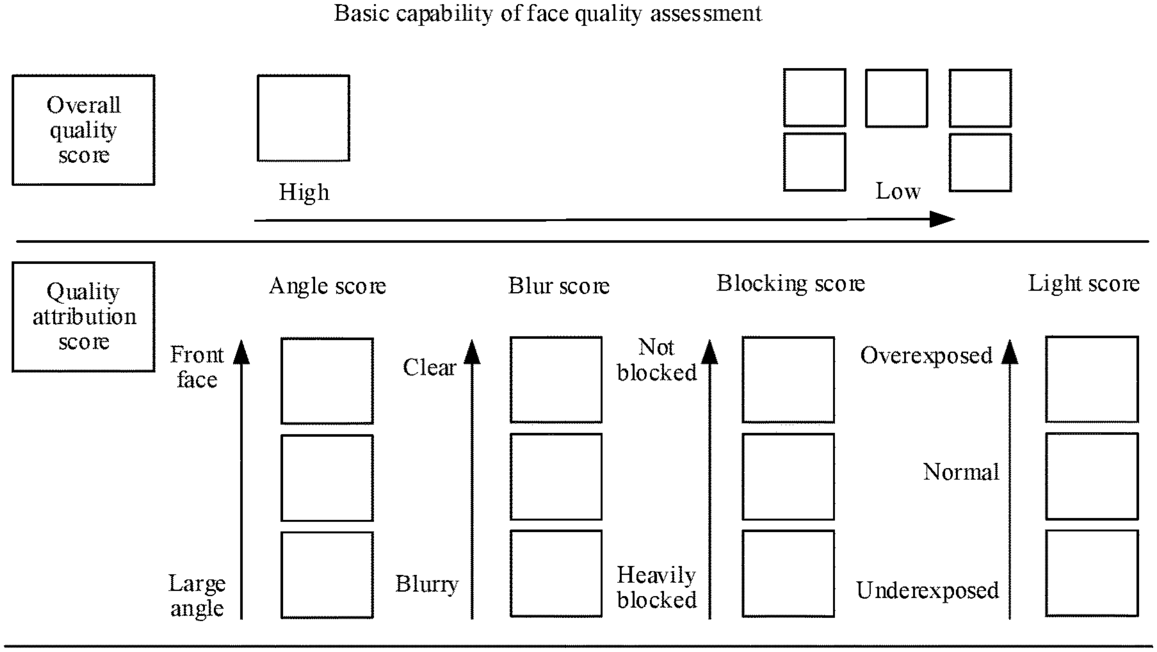
FIG. 9 is a schematic diagram of a basic capability of face quality assessment.

In an example, FIG. 9 is an exemplary schematic diagram of a basic capability of face quality assessment. In a face image in FIG. 9, from a large angle of a face to a front face, an angle score of the face image increases accordingly. In the face image, from blurred to clear, a blur score of the face image also gradually increases accordingly. In the face image, from heavily blocked to not blocked, a blocking score of the face image increases accordingly. In the face image, from underexposed, normal, to overexposed, a light score of the face image increases accordingly.

Figure 10:
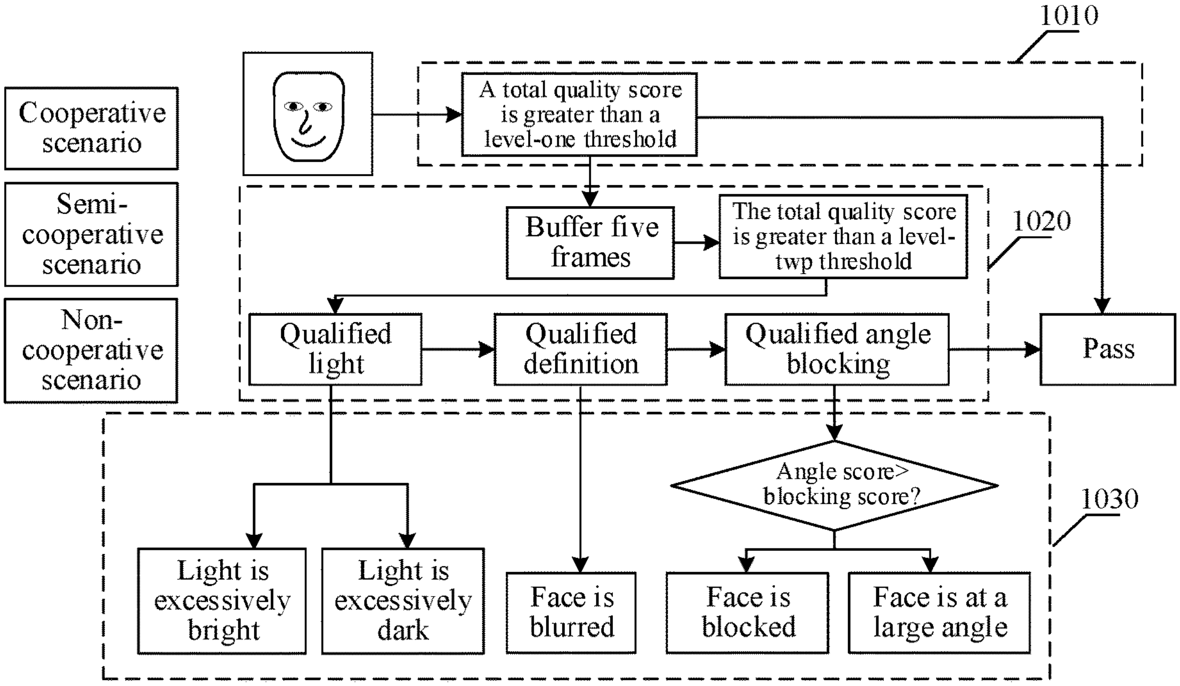
FIG. 10 is a schematic diagram of a solution of selecting a face image.

In an example, FIG. 10 is an exemplary schematic diagram of a solution of selecting a face image. A process of performing face selection in a cooperative scenario is embodied in a part circled by a dashed box 1010 in FIG. 10, and a process of performing the face selection in a semi-cooperative scenario is embodied in a part circled by a dashed box 1020 in FIG. 10. In this case, it is necessary to determine a quality attribution score of a face image and then determine a light score, a blur score, an angle score, and a blocking score of the face image in sequence. If a quality attribution score of any one of the items is unqualified, it may be determined that it is in a non-cooperative scenario. A process of performing the face selection in a non-cooperative scenario is mainly embodied in a part circled by a dashed box 1030 in FIG. 10. In this case, a device prompts a user to make a corresponding adjustment based on the quality attribution score, for example, prompt information indicating that light is excessively bright, light is excessively dark, a face is blurred, a face is blocked, or a face is in a large angle. Because that the face is blocked is similar to that the face is in the large angle in some cases, a reason for the low quality of the face image may be determined by comparing a value of the angle score with a value of the blocking score. If the angle score is greater than the blocking score, it may be determined that there is a problem that the face twists by an excessively large angle. If the angle score is less than the blocking score, it may be determined that there is a problem that the face is blocked.

A typical implementation of the technical solution of this application is introduced below, and then beneficial effects brought by the technical solution of this application is fully explained. Taking a face recognition payment scenario as an example, a complete process of completing face recognition usually includes three phases, namely, a video stream acquisition phase, a face selection phase, and a face recognition phase.

A method of a conventional technical solution adopted in the video stream acquisition phase is that after a fixed quantity of frames of face images are filtered out from an acquired face video stream, in the face selection phase, quality of the face images is determined to filter out a face image of poor quality acquired by an image acquisition device in an automatic exposure adjustment state. For example, first 20 frames of face images in the face video stream are fixedly filtered out, and a face selection process is started from a $21^{st}$ frame of face image. However, most face recognition payment scenarios are cooperative scenarios, and the automatic exposure adjustment of the image acquisition device is very short. In the conventional technical solution, it cannot be determined automatically whether the automatic exposure adjustment has ended, and the face selection is still started after the fixed quantity of frames of face images are filtered out, which wastes some useful face image frames, resulting in more time consumptions. However, a method of the technical solution of this application adopted in the video stream acquisition phase is that the automatic exposure adjustment state of the image acquisition device is adaptively determined according to the image brightness. Provided that there is a face image whose brightness meets a condition, the quality of the face image may be determined. For example, the automatic exposure adjustment process has ended at an eighth frame. In the technical solution of this application, it may be adaptively determined that a brightness of the eighth frame of face image meets the condition, and then quality of the eighth frame of face image is determined without waiting for a $21^{st}$ frame, which effectively reduces more than a half of time consumptions in the video stream acquisition phase.

A method of a conventional technical solution adopted in the face selection phase is that a fixed quantity of frames of face images are buffered from a face video stream for detection, and a frame of face image with best quality is optimally selected from the face images. If the face image cannot pass face recognition, a fixed quantity of frames of face images are buffered from the face video stream again, the foregoing step is repeated, and finally a selected image is transmitted to a face recognition process. For example, $21^{st}$ to $25^{th}$ frames of face images are buffered from the face video stream, quality of the five frames of face images is detected respectively, and then a face image with good quality is selected or next five frames of face images are continuously buffered. However, a method of the technical solution of this application adopted in the face selection phase is that an overall quality score of a face image is first calculated frame by frame according to overall quality, the face image may be transmitted to the face recognition process provided that the overall quality score of the face image is greater than a threshold, and if overall quality scores of n consecutive frames of face images are less than the threshold, a quality attribution score of a face image with the highest overall quality score may be calculated from a plurality of dimensions, a reason of low quality of the face image is analyzed, and a user is prompted to make a corresponding adjustment, to improve user experience and cultivate correct usage habit of the user. For example, when a brightness of an eighth frame of face image meets the condition, an overall quality score of the eighth frame of face image is calculated. If the overall quality score of the eighth frame of face image is greater than the threshold, the eighth frame of face image may be sent to the face recognition process.

In some embodiments, only the face selection phases may be compared. Assuming that a starting position of the face selection process of the conventional technical solution in the face video stream is the same as that of the technical solution of this application, that is, at a $21^{st}$ frame. In the conventional technical solution, quality of five frames of a $21^{st}$ frame to a $25^{th}$ frame of face images is determined, and in the technical solution of this application, frame-by-frame detection is adopted, and an overall quality score is calculated immediately from the $21^{st}$ frame. If the $21^{st}$ frame of face image is of good quality, in this application, the $21^{st}$ frame of face image may be immediately transmitted to the face recognition process. However, in the conventional technical solution, overall quality scores of the five frames need to be calculated and then the $21^{st}$ frame of face image is selected, and then the face image is transmitted into the face recognition process. In this case, the technical solution of this application is five times faster than the conventional technical solution. Even in the worst case, a quantity of detections of this application is similar to that of the conventional technical solution, so that the speed of face selection can be effectively improved, to ultimately shorten time consumed in the complete face recognition process.

Reference may be made to experimental statistical data provided in Table 1. In Table 1, the technical solution of this application is compared with the conventional technical solution from the perspective of time consumption. It is found through the experimental statistics that a duration required for completing the face recognition payment in the conventional technical solution is about 3.05 seconds, and a duration required for completing the face recognition payment in the technical solution of this application is about 1.37 seconds. Compared with the conventional technical solution, in the technical solution of this application, the duration required for the face recognition payment is reduced by more than a half.

TABLE 1

| Solution | Conventional solution | This application |
|---|---|---|
| Time consumption (seconds) | About 3.05 | About 1.37 |

Figure 11:
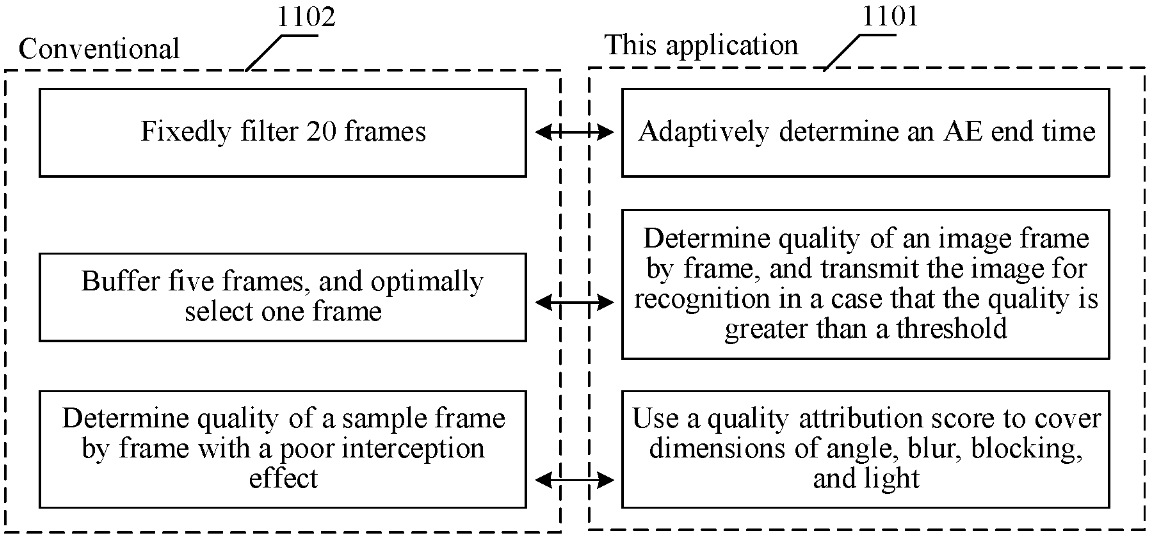
FIG. 11 is a diagram of a comparison of solutions of selecting a face image.

In an example, FIG. 11 is an exemplary schematic diagram of a comparison between solutions of selecting a face image. In a conventional technical solution 1102, a solution adopted for the automatic exposure adjustment process is to filter out 20 frames fixedly. A solution adopted for determining quality of a face image is to buffer five frames, optimally select one frame, and determine a quality sample frame by frame, causing a poor intercepting effect. In a technical solution 1101 provided by this embodiment, a solution adopted for the automatic exposure adjustment process is to adaptively determine an AE end time. A solution adopted for determining quality of a face image is to determine quality of an image frame by frame, and transmit the face image for recognition if the quality is greater than a threshold. In addition, a quality attribution score is used, and dimensions of angle, blur, blocking, and light may be covered to determine the quality of the face image, so that the effect is significantly better than that in the conventional solution.

Based on the foregoing, in the technical solution provided by this embodiment of this application, when a brightness of an image is qualified, the image meets a preliminary screening condition, and then an overall quality score of the face image is outputted by using a first scoring model. When overall quality scores of a plurality of consecutive frames of face images are less than a level-one threshold, a quality attribution score of the face image is outputted by using a second scoring model. The quality of the face image may be determined from a plurality of dimensions. When the quality attribution score meets the condition, the face image may be transmitted to a face recognition process, which effectively reduces time required for face selection.

In addition, when the quality attribution score does not meet the condition, the reason why the quality of the face image is not qualified may also be analyzed according to the quality attribution score, and a user is prompted to make a corresponding adjustment.

Figure 12:
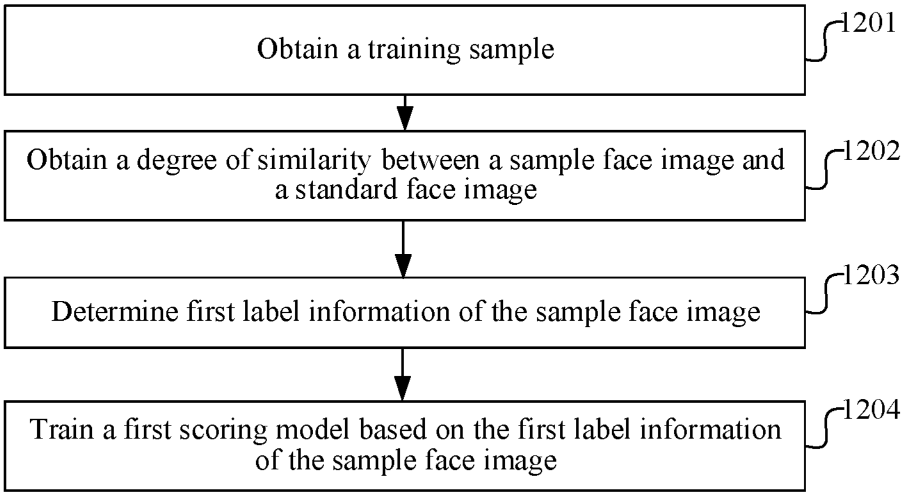
FIG. 12 is a flowchart of a method for training a first scoring model according to an embodiment of this application.

In one embodiment, as shown in FIG. 12, a method for training a first scoring model includes the following steps (1201 to 1204).

Step S1201. Obtain a training sample.

The training sample includes a sample face image and a standard face image corresponding to the sample face image. The sample face image is an image including a sample face. The standard face image corresponding to the sample face image is a high-quality image corresponding to the sample face and is used as a reference. In some embodiments, the sample face image is a living photo including the sample face. In some embodiments, the standard face image is an identification photo corresponding to the sample face.

Step 1202. Obtain a degree of similarity between the sample face image and the standard face image.

The degree of similarity may reflect a degree of similarity between the sample face image and the standard face image, and is generally determined by calculating a distance between a feature vector corresponding to the sample face image and a feature vector corresponding to the standard face image. In some embodiments, Step 1102 includes the following substeps.

Step 1202*a*. Perform feature recognition on the sample face image, to obtain feature information of the sample face image.

The feature recognition refers to processing of recognizing feature information of the sample face in the sample face image, and the feature information of the sample face image reflects richness of information about the sample face.

In some embodiments, the feature recognition is performed on the sample face image by using a face feature recognition model, to obtain a feature of the sample face image. The face feature recognition model is a mathematical model configured to recognize face feature information.

Step 1202*b*. Perform the feature recognition on the standard face image, to obtain feature information of the standard face image. In some embodiments, the feature recognition is performed on the standard face image by using the face feature recognition model, to obtain a feature of the standard face image.

Step 1202*c*. Obtain the degree of similarity between the sample face image and the standard face image based on the feature information of the sample face image and the feature information of the standard face image.

The feature information of the sample face image is compared with the feature information of the standard face image, and the degree of similarity between the sample face image and the standard face image is calculated. The comparison refers to a process of comparing the degree of similarity between the feature information of the sample face image and the feature information of the standard face image. In some embodiments, the degree of similarity between the sample face image and the standard face image is reflected by calculating a distance between the feature vector of the sample face image and the feature vector of the standard face image. In some embodiments, the distance between the feature vector of the sample face image and the feature vector of the standard face image includes a Euclidian distance, a Manhattan distance, a Minkowski distance, a Cosine similarity, or another distance reflecting a degree of similarity between two feature vectors. This is not limited in this embodiment of this application. In some embodiments, the degree of similarity between the sample face image and the standard face image is measured by a Pearson correlation coefficient. In statistics, the Pearson correlation coefficient, also referred to as a Pearson product-moment correlation coefficient (referred to as PPMCC or PCC), is used for measuring a correlation degree (linear correlation) between two variables. A value of the Pearson correlation coefficient is between −1 and 1. The Pearson correlation coefficient between two variables is defined as a quotient of a covariance and a standard deviation between the two variables.

The degree of similarity is used for determining first label information of the sample face image. The first label information is label information of an overall quality score. In some embodiments, the degree of similarity is used as an overall quality score of the sample face image, and recorded as the first label information of the sample face image, to reflect overall quality of the sample face image. The sample face image has a higher degree of similarity, it indicates that the overall quality score of the sample face image is higher, and the overall quality of the sample face image is better.

In some embodiments, the feature of the sample face image is denoted as f(Ik). The feature of the standard face image is denoted as f(I0). The degree of similarity between the sample face image and the standard face image is denoted as Sk, and the overall quality score of the label information of the sample face image is denoted as Qk. The degree of similarity Sk between the sample face image and the standard face image and the overall quality score Qk of the label information of the sample face image may be obtained by using the following formula.

$$S_k = \frac{f(I_0) \cdot f(I_k)}{\|f(I_0)\| \|f(I_k)\|} = Q_k$$

The degree of similarity between the sample face image and the standard face image is used as the label information of the sample face image. In this way, a label of the overall quality score of the sample face image may be automatically generated directly through the feature recognition, to eliminate the costs of marking the sample face image, and the first scoring model is trained in this way. Finally, an overall quality score of a picture may be obtained without referring to the standard face image.

Step 1203. Determine first label information of the sample face image.

In some embodiments, the degree of similarity, that is, the overall quality score of the sample face image, is used as the first label information of the sample face image.

Step 1204. Train the first scoring model based on the first label information of the sample face image.

In some embodiments, the sample face image marked with the first label information is inputted into the first scoring model, and a predicted overall quality score of the sample face image is outputted by using the first scoring model. The predicted overall quality score is an overall quality score obtained by predicting the sample face image and outputted by the first scoring model.

In some embodiments, a loss function corresponding to the first scoring model is set, to constrain the first scoring model and improve accuracy of the first scoring model. In some embodiments, a mean squared error (MSE) is combined with the Pearson correlation coefficient to construct the loss function corresponding to the first scoring model. In this way, the predicted overall quality score may be fit based on linear regression of a feature of the recognized sample face image and in an interval order-preserving manner. In some embodiments, the loss function can be represented by using the following formula:

$$\text{Loss} = \|Y - X\|^2 + \frac{\varepsilon[(X - \mu X)(Y - \mu Y)]}{\sigma X \sigma Y}$$

where X is a predicted overall quality score, Y is a label value, μX and μY are means, and σX, σY is a variance. The overall quality score is constrained by using the MSE loss function, and to ensure overall consistency and order, the Pearson correlation coefficient is added, to constrain the overall order preservation of the sample. Correspondingly, when a value of the loss function is lower, the accuracy of the corresponding first scoring model is higher, that is, the overall quality score in the label information of the sample face image is closer to the predicted overall quality score.

Figure 13:
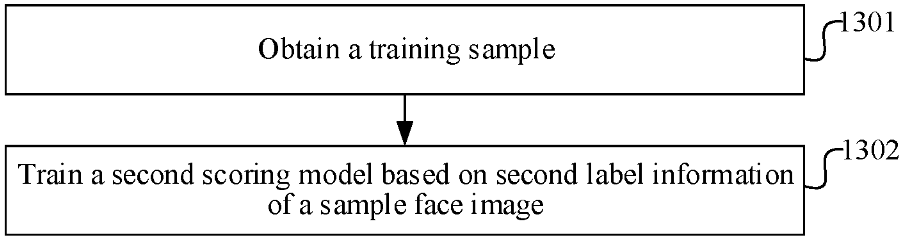
FIG. 13 is a flowchart of a method for training a second scoring model according to an embodiment of this application.

In one embodiment, as shown in FIG. 13, a method for training a second scoring model includes the following steps (1301 to 1302).

Step S1301. Obtain a training sample.

The training sample includes a sample face image and second label information of the sample face image. The second label information includes quality level information in a plurality of quality reference dimensions. The quality level information is used for reflecting quality of the sample face image in a quality reference dimension. In some embodiments, the quality level corresponding to each quality reference dimension is divided into five levels, that is, the sample face image is divided into five levels in each quality reference dimension. Only quality levels of the sample face image are marked as weak supervision information, that is, the second label information, of the sample face image, so that the second scoring model learns an order relationship distribution within the quality level in each quality reference dimension, to obtain a score of each quality reference dimension, thereby resolving a problem that d marking a training sample is difficult under a condition of consecutive variables.

In some embodiments, a label value of the second label information reflects a probability that the sample face image is distributed in a quality reference dimension. For example, when there are five quality levels, a value range of the label value of an angle score in the second label information may be 0, 0.25, 0.5, 0.75, and 1. Specifically, the second label information includes label values respectively corresponding to an angle score, a blur score, a light score, and a blocking score. For example, the angle score is 0, the blur score is 1, the light score is 0.25, and the blocking score is 0.5.

Step 1302. Train the second scoring model based on the second label information of the sample face image.

The sample face image carrying the second label information is inputted into the second scoring model, and a quality attribution score of the sample face image is outputted by using the second scoring model.

In some embodiments, a loss function corresponding to the second scoring model is set, to constrain the second scoring model and improve accuracy of the second scoring model. In some embodiments, based on a Gaussian mixture model (GMM), a weakly supervised training loss function-Gaussian mixture loss (GMM Loss) function is designed. The Gaussian mixture model is to accurately quantify an object by using a Gaussian probability density function (a normal distribution curve), and is a model formed by decomposing the object into a plurality of objects and based on the Gaussian probability density function (the normal distribution curve). In some embodiments, the Gaussian mixture model uses K Gaussian models to represent the quality of the sample face image in each quality reference dimension.

In some embodiments, a formula of the loss function corresponding to the second scoring model is as follows:

$$p(x_i \mid z_i) = N\left(x_i; \mu_{z_i}, \sum z_i\right)$$

$$p(z_i \mid x_i) = \frac{N\left(x_i; \mu_{z_i}, \sum z_i\right) p(z_i)}{\sum_{k=1}^{K} N\left(x_i; \mu_{z_i}, \sum z_i\right) p(k)}$$

where $x_i$ is an input picture, $\mu_{z_i}$ is a mean of a $z_i^{th}$ category, $\Sigma z_i$ is a variance of the $z_i^{th}$ category, $p(z_i)$ is a probability of the $z_i^{th}$ category, k is a type, K is a quantity of types, and p(k) is a probability of a $k^{th}$ category.

In some embodiments, the loss function of the second scoring model may be selected according to a difference between a label value of the training sample and a predicted value outputted by the second scoring model. If the difference between the label value of the training sample and the predicted value outputted by the second scoring model is greater than a preset threshold, the loss function of the second scoring model constructed based on a mean squared error is selected to constrain the second scoring model. If the difference between the label value of the training sample and the predicted value outputted by the second scoring model is less than or equal to the preset threshold, the loss function of the second scoring model constructed based on the Gaussian mixture model and a cross entropy is selected to constrain the second scoring model. The cross entropy is used for measuring difference information between two probability distributions.

Figure 14:
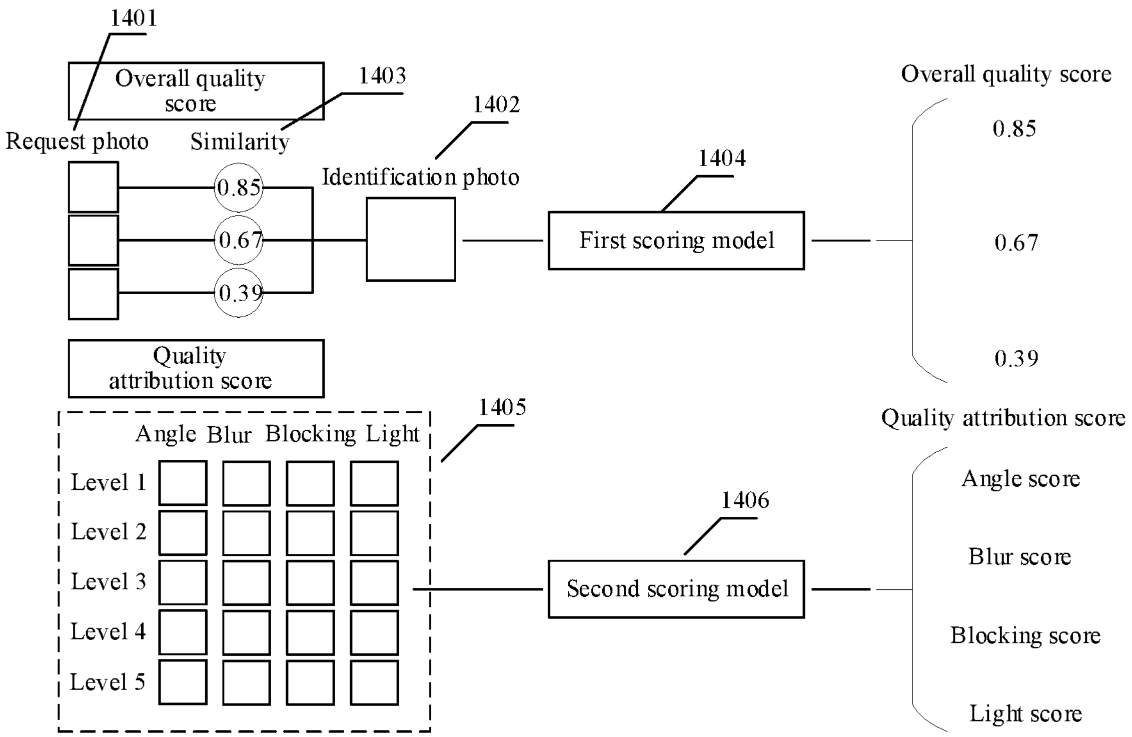
FIG. 14 is a schematic diagram of training a first scoring model and a second scoring model.

In an example, as shown in FIG. 14, FIG. 14 is an exemplary schematic diagram of training a first scoring model and a second scoring model. A degree of similarity 1403 between a request photo 1401 and an identification photo 1402 is used as a first label value of a sample, and the request photo 1401 carrying the first label value is transmitted into a first scoring model 1404, to obtain an overall quality score corresponding to the request photo 1401. In addition, first, a training sample is classified into four categories according to four dimensions of angle, blur, blocking, and light. Next, a face image in each dimension is divided into five levels to obtain a training sample 1405 of a second scoring model 1406, and then the training sample 1405 carrying level information is transmitted to the second scoring model 1406, to obtain a quality attribution score of each picture in the training sample 1405.

In one embodiment, the method for training a first scoring model or the method for training a second scoring model further includes the following steps.

Step 1. Obtain a conflict sample in the training sample.

The conflict sample is a training sample in which an overall quality score conflicts with a quality attribution score, for example, a sample face image whose an overall quality score is greater than a level-one threshold but a quality attribution score does not meet a condition, or a sample face image whose a quality attribution score meets a condition but an overall quality score is less than the level-one threshold.

Step 2. Correct label information of the conflict sample.

In some embodiments, the label information of the conflict sample is corrected by using a gradient-boosted decision tree (GDBT) algorithm, and the first label information and the second label information of the sample face image in the conflict sample are re-marked, so that a predicted overall quality score of the conflict sample and the quality attribution score no longer conflict.

Figure 15:
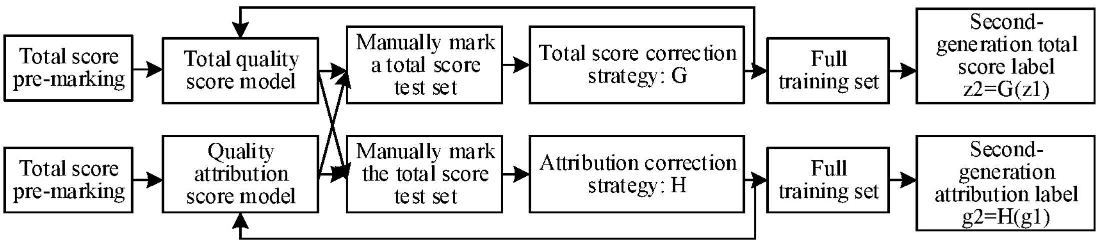
FIG. 15 is a schematic diagram of correcting label information of a conflict sample.

In an example, FIG. 15 is an exemplary schematic diagram of correcting label information of a conflict sample. First, total score (that is, the overall quality score) pre-marking and attribution (the quality attribution score) are performed on a training sample respectively, and the sample is transmitted to a total quality score model (the first scoring model) and a quality attribution model (the second scoring model) respectively. A conflict sample is obtained manually, and a total score correction strategy function G(z) and an attribution correction strategy function H(g) are formulated based on the conflict sample, to obtain a second-generation total score label and a second-generation attribution label.

Step 3. Obtain a corrected training sample.

The corrected training sample is used for retraining the first scoring model and the second scoring model, to obtain the first scoring model and the second scoring model with more accurate predicted scores.

Based on the foregoing, in the technical solution provided by this embodiment of this application, sample marking costs are greatly reduced by using a degree of similarity between a sample image and a standard image as a label value of a first scoring model. A loss function corresponding to the first scoring model is constructed based on a combination of a mean square error and a Pearson correlation coefficient, and a more accurate first scoring model is obtained, thereby improving accuracy of overall face quality prediction.

In addition, the sample image is classified into four categories according to four dimension of angle, blur, blocking, and light. Then, a face image under each dimension is divided into different levels and level information is used as weak supervision information of the sample, to train a second scoring model, so that the second scoring model outputs consecutive quality attribution scores, to resolve a problem that marking a training sample is difficult under a condition of consecutive variables. By designing a weakly supervised training loss function based on a Gaussian mixture model, the second scoring model is more accurate.

In addition, by finding and correcting a conflict sample, the first scoring model and the second scoring model are retrained, thereby further improving the accuracy of the model in predicting quality of the face image.

The following is an apparatus embodiment of this application, which can be used to execute the method embodiments of this application. For details not disclosed in the apparatus embodiments of this application, refer to the method embodiments of this application.

Figure 16:
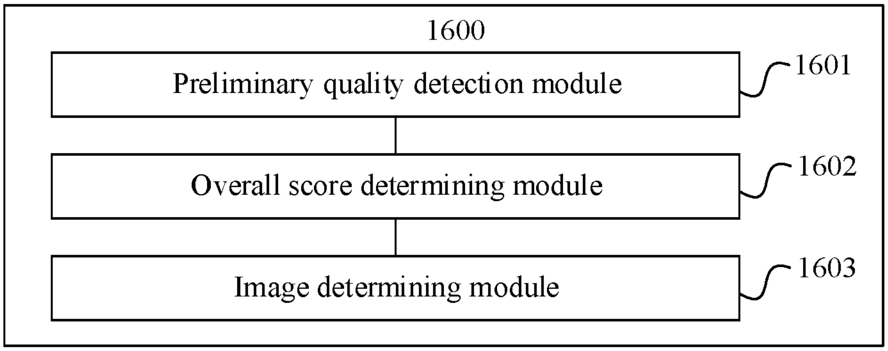
FIG. 16 is a block diagram of an apparatus for selecting a face image according to an embodiment of this application.

FIG. 16 is a block diagram of an apparatus according to an embodiment of this application. The apparatus has a function of implementing the foregoing method. The apparatus 1600 may include: a preliminary quality detection module 1601, an overall score determining module 1602, and an image determining module 1603.

The preliminary quality detection module 1601 is configured to detect, after each time a frame of face image is obtained, whether the face image meets a preliminary quality screening condition.

The overall score determining module 1602 is configured to determine, in response to detecting a first face image that meets the preliminary quality screening condition, an overall quality score of the first face image, the overall quality score being used for representing overall quality of the face image.

The image determining module 1603 is configured to transmit the first face image to a face recognition process in response to the overall quality score of the first face image being greater than a level-one threshold.

In one embodiment, the preliminary quality detection module 1601 is configured to:

obtain a light score of the face image, the light score being used for representing a brightness degree of the face image; and detect, according to the light score of the face image, whether the face image meets the preliminary quality screening condition.

In one embodiment, the overall score determining module 1602 is configured to:

invoke a first scoring model, where the first scoring model is a neural network model configured to determine the overall quality score; and determine the overall quality score of the first face image by using the first scoring model.

In one embodiment, a process of training the first scoring model is as follows: obtaining a training sample, where the training sample includes a sample face image and a standard face image corresponding to the sample face image; obtaining a degree of similarity between the sample face image and the standard face image, where the degree of similarity is used for determining first label information of the sample face image, and the first label information is label information of the overall quality score; and training the first scoring model based on the first label information of the sample face image.

Figure 17:
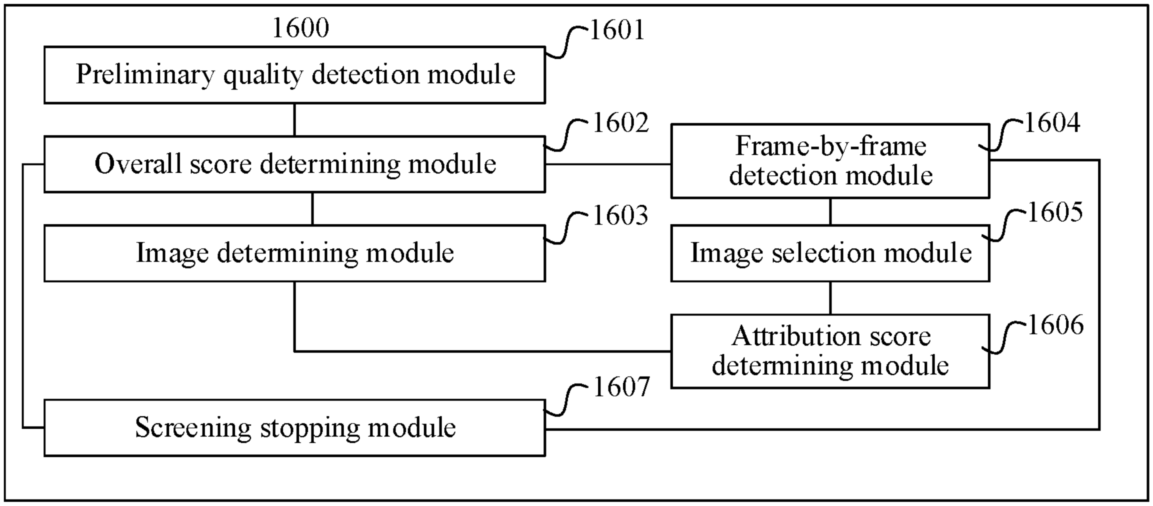
FIG. 17 is a block diagram of an apparatus for selecting a face image according to another embodiment of this application.

In one embodiment, referring to FIG. 17, the apparatus 1600 further includes a frame-by-frame detection module 1604 configured to: obtain an overall quality score of a next frame of face image when the overall quality score of the first face image is less than the level-one threshold, where the initial next frame of face image is a next frame of face image of the first face image; transmit the next frame of face image to the face recognition process when the overall quality score of the next frame of face image is greater than the level-one threshold; and start, when the overall quality score of the next frame of face image is less than the level-one threshold, execution from the operation of obtaining an overall quality score of a next frame of face image.

In one embodiment, referring to FIG. 17, the apparatus 1600 further includes: an image selection module 1605 and an attribution score determining module 1606.

The image selection module 1605 is configured to select, when overall quality scores of n consecutive frames of face images are less than the level-one threshold, a second face image with a highest overall quality score from the n consecutive frames of face images.

The attribution score determining module 1606 is configured to determine a quality attribution score of the second face image when the overall quality score of the second face image is greater than a level-two threshold, where the quality attribution score includes quality scores in a plurality of quality reference dimensions, and the level-two threshold is less than the level-one threshold.

The image determining module 1603 is configured to transmit the second face image to the face recognition process when the quality attribution score of the second face image meets a condition.

In one embodiment, the attribution score determining module 1606 is configured to: invoke a second scoring model, where the second scoring model is a neural network model configured to determine the quality attribution score; and determine the quality attribution score of the second face image by using the second scoring model, where the quality attribution score includes at least one of an angle score, a blur score, a blocking score, or a light score, the angle score is used for representing a face angle of the face image, the blur score is used for representing a blur degree of the face image, the blocking score is used for representing a blocking situation of the face image, and the light score is used for representing a brightness degree of the face image.

In one embodiment, a process of training the second scoring model is as follows: obtaining a training sample, where the training sample includes a sample face image and second label information of the sample face image, and the second label information includes quality level information in the plurality of quality reference dimensions; and training the second scoring model based on the second label information of the sample face image.

In one embodiment, the attribution score determining module 1606 is further configured to display adjustment information according to the quality attribution score in response to the quality attribution score of the second face image not meeting the condition, where the adjustment information is information for prompting a user to make an adjustment to improve quality of the face image.

In one embodiment, the processes of training the first scoring model and the second scoring model further include: obtaining a conflict sample in the training sample, where the conflict sample is a training sample in which an overall quality score conflicts with a quality attribution score; and correcting label information of the conflict sample.

In one embodiment, referring to FIG. 17, the apparatus 1600 further includes a screening stopping module 1607 configured to: stop a face screening process when the overall quality score of the first face image is less than the level-two threshold, and display prompt information, the prompt information being used for prompting the user that the computer device needs to reobtain the face image, where the level-two threshold is less than the level-one threshold.

Based on the foregoing, in the technical solution provided by this embodiment of this application, preliminary screening is performed on a face image through frame-by-frame detection, which improves flexibility of a face selection process. Then, an overall quality score of the face image that has passed the preliminary screening is determined to reflect overall quality of the face image. When the overall quality of the face image is qualified, the face image may be transmitted to a face recognition process, which effectively reduces time required for the face selection, thereby helping to shorten the time consumed in the face recognition process, and improving user experience.

Figure 18:
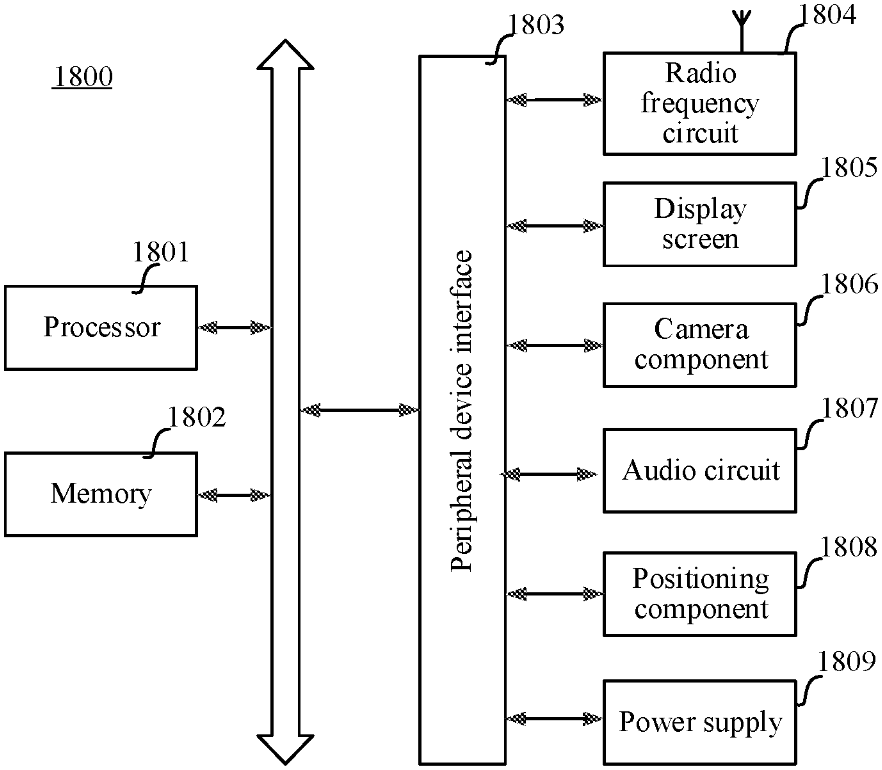
FIG. 18 is a structural block diagram of a computer device according to an embodiment of this application.

FIG. 18 is a structural block diagram of a computer device 1800 according to an embodiment of this application. The computer device 1800 may be an electronic device such as a mobile phone, a tablet computer, a multimedia player, a wearable device, a personal computer (PC), a face payment terminal, a face check-in terminal, a smart camera, or the like. The terminal is configured to implement the method provided in the foregoing embodiments. The computer device may be the terminal 10 or the server 20 in the application operating environment shown in FIG. 1.

Generally, the computer device 1800 includes a processor 1801 and a memory 1802.

The processor 1801 may include one or more processing cores, for example, a 4-core processor or an 8-core processor. The processor 1801 may be implemented by using at least one hardware form of a digital signal processor (DSP), a field programmable gate array (FPGA), and a programmable logic array (PLA). The processor 1801 may alternatively include a main processor and a coprocessor. The main processor is configured to process data in an active state, also referred to as a central processing unit (CPU). The coprocessor is a low-power processor configured to process data in a standby state. In some embodiments, the processor 1801 may be integrated with a graphics processing unit (GPU). The GPU is configured to render and draw content that needs to be displayed on a display screen. In some embodiments, the processor 1801 may further include an artificial intelligence (AI) processor. The AI processor is configured to process a computing operation related to machine learning.

The memory 1802 may include one or more computer-readable storage media. The computer-readable storage media may be non-transient. The memory 1802 may further include a high-speed random access memory, and a non-volatile memory such as one or more magnetic disk storage devices and a flash memory device. In some embodiments, the non-transient computer-readable storage medium in the memory 1802 is configured to store at least one instruction, at least one program, a code set, or an instruction set, the at least one instruction, the at least one program, the code set, or the instruction set being configured to be executed by one or more processors to implement the foregoing face image selection method.

In some embodiments, the computer device 1800 further in some embodiments includes a peripheral interface 1803 and at least one peripheral. The processor 1801, the memory 1802, and the peripheral device interface 1803 may be connected through a bus or a signal cable. Each peripheral device may be connected to the peripheral device interface 1803 through a bus, a signal cable, or a circuit board. Specifically, the peripheral device includes at least one of a radio frequency (RF) circuit 1804, a display screen 1805, a camera component 1806, an audio circuit 1807, a positioning component 1808, and a power supply 1809.

A person skilled in the art may understand that the structure shown in FIG. 18 does not constitute any limitation on the computer device 1800, and the computer device may include more components or fewer components than those shown in the figure, or some components may be combined, or a different component deployment may be used.

In one embodiment, a computer-readable storage medium is further provided. The storage medium stores at least one instruction, at least one program, a code set, or an instruction set, and the at least one instruction, the at least one program, the code set, or the instruction set, when executed by a processor, implements the foregoing method for selecting a face image.

In one embodiment, a computer-readable storage medium is further provided. The storage medium stores at least one instruction, at least one program, a code set, or an instruction set, and the at least one instruction, the at least one program, the code set, or the instruction set, when executed by a processor, implements the foregoing method for selecting a face image.

In some embodiments, the computer-readable storage medium may include: a read-only memory (ROM), a RAM, a solid state drive (SSD), an optical disc, or the like. The RAM may include a resistance random access memory (ReRAM) and a dynamic random access memory (DRAM).

In one embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing method for selecting a face image.

In one embodiment, a computer program product or a computer program is provided. The computer program product or the computer program includes computer instructions, and the computer instructions are stored in a computer-readable storage medium. A processor of a computer device reads the computer instructions from the computer-readable storage medium, and executes the computer instructions, to cause the computer device to perform the foregoing method for selecting a face image.

It is to be understood that "plurality of" mentioned in the specification means two or more. And/or describes an association relationship for describing associated objects and represents that three relationships may exist. For example, A and/or B may represent the following three cases: Only A exists, both A and B exist, and only B exists. The character "/" generally indicates an "or" relationship between the associated objects. In addition, the step numbers described in this specification merely exemplarily show an execution sequence of the steps. In some other embodiments, the steps may not be performed according to the number sequence. For example, two steps with different numbers may be performed simultaneously, or two steps with different numbers may be performed according to a sequence contrary to the sequence shown in the figure. This is not limited in the embodiments of this application.

The foregoing descriptions are merely exemplary embodiments of this application, but are not intended to limit this application. Any modification, equivalent replacement, improvement, and the like made within the spirit and principle of this application should fall within the protection scope of this application.

What is claimed is:

1. A method for selecting a face image, performed by a computer device, the method comprising:

obtaining a training sample comprising a sample face image and a standard face image corresponding to the sample face image;

training a first scoring model based on a degree of similarity between the sample face image and the standard face image, wherein calculating the degree of similarity comprises calculating a distance between a feature vector of the sample face image and a feature vector of the standard face image;

obtaining, after a frame of a face image is obtained, a light score of the face image, the light score representing a brightness degree of the face image;

detecting, according to the light score of the face image, whether the face image meets a preliminary quality screening condition based on a comparison of the light score to a light score threshold, the light score threshold being determined based on an automatic exposure parameter and at least one of a parameter of an image acquisition device or an environmental parameter;

determining, in response to a first face image meeting the preliminary quality screening condition, that an automatic exposure adjustment process of the image acquisition device has ended, and an overall quality score of the first face image, the overall quality score representing overall quality of the face image, the overall quality score being determined using the first scoring model, the first scoring model being a neural network model configured to determine the overall quality score;

transmitting the first face image to a face recognition process in response to the overall quality score of the first face image being greater than a level-one threshold;

determining, in response to overall quality scores of n consecutive frames of face images being less than the level-one threshold, whether an overall quality score and a quality attribution score of a second face image meet a condition, wherein the second face image is a face image with a highest overall quality score among the n consecutive frames of face images, the quality attribution score comprises a plurality of dimensional quality scores in a plurality of quality reference dimensions, the overall quality score and the quality attribution score of the second face image meet the condition when the overall quality score of the second face image is greater than a level-two threshold and each of the plurality of dimensional quality scores of the quality attribution score of the second face image individually meets a respective threshold condition, the level-two threshold is less than the level-one threshold, n is a positive integer greater than 1; and transmitting the second face image to the face recognition process in response to the overall quality score and the quality attribution score of the second face image meeting the condition.

2. The method according to claim 1, wherein the determining the overall quality score of the first face image comprises:

invoking the first scoring model.

3. The method according to claim 2, further comprising:

obtaining the degree of similarity between the sample face image and the standard face image, wherein the degree of similarity is used for determining first label information of the sample face image, the first label information is label information of the overall quality score, and the first scoring model is trained based on the first label information of the sample face image.

4. The method according to claim 1, wherein after the determining the overall quality score of the first face image, the method further comprises iterations of:

obtaining an overall quality score of a next frame of face image in response to the overall quality score of the first face image being less than the level-one threshold, wherein the next frame of face image is a next frame of the first face image;

transmitting the next frame of face image to the face recognition process in response to an overall quality score of the next frame of face image being greater than the level-one threshold; and in response to the overall quality score of the next frame of face image being less than the level-one threshold, obtaining an overall quality score of a next frame of face image again.

5. The method according to claim 1, wherein the determining the quality attribution score of the second face image comprises:

invoking a second scoring model, wherein the second scoring model is a neural network model configured to determine the quality attribution score; and determining the quality attribution score of the second face image by using the second scoring model, wherein the plurality of dimensional quality scores of the quality attribution score comprises three or more of an angle score, a blur score, a blocking score, or a light score, the angle score representing a face angle of the face image, the blur score representing a blur degree of the face image, the blocking score representing a blocking situation of the face image, and the light score is used for representing a brightness degree of the face image.

6. The method according to claim 5, further comprising: training the second scoring model according to the following training process:

obtaining a training sample, wherein the training sample comprises a sample face image and second label information of the sample face image, and the second label information comprises quality level information in the plurality of quality reference dimensions; and training the second scoring model based on the second label information of the sample face image.

7. The method according to claim 1, further comprising: displaying adjustment information according to the quality attribution score in response to the quality attribution score of the second face image not meeting the condition, wherein the adjustment information is information for prompting a user to make an adjustment to improve quality of the face image.

8. The method according to claim 3, further comprising: obtaining a conflict sample in the training sample, wherein the conflict sample is a training sample in which an overall quality score conflicts with the quality attribution score; and correcting label information of the conflict sample.

9. The method according to claim 1, wherein the determining an overall quality score of the first face image, further comprises:

stopping detecting whether a face image obtained after the first face image meets the preliminary quality screening condition.

10. The method according to claim 1, wherein after the determining the overall quality score of the first face image, the method further comprises:

stopping a face screening process in response to the overall quality score of the first face image being less than the level-two threshold, and displaying prompt information, wherein the prompt information indicating that the computer device needs to reobtain the face image, and the level-two threshold is less than the level-one threshold.

11. A computer device, comprising: a processor and a memory, the memory storing at least one instruction, at least one program, a code set, or an instruction set, the at least one instruction, the at least one program, the code set, or the instruction set being loaded and executed by the processor to implement a method for selecting a face image comprising:

obtaining a training sample comprising a sample face image and a standard face image corresponding to the sample face image;

training a first scoring model based on a degree of similarity between the sample face image and the standard face image, wherein calculating the degree of similarity comprises calculating a distance between a feature vector of the sample face image and a feature vector of the standard face image;

obtaining, after a frame of a first face image is obtained, a light score of the face image, the light score representing a brightness degree of the face image;

detecting, according to the light score of the face image, whether the face image meets a preliminary quality screening condition based on a comparison of the light score to a light score threshold, the light score threshold being determined based on an automatic exposure parameter and at least one of a parameter of an image acquisition device or an environmental parameter;

determining, in response to a first face image meeting the preliminary quality screening condition, that an automatic exposure adjustment process of the image acquisition device has ended, and an overall quality score of the first face image, the overall quality score representing overall quality of the face image, the overall quality score being determined using the first scoring model, the first scoring model being a neural network model configured to determine the overall quality score;

transmitting the first face image to a face recognition process in response to the overall quality score of the first face image being greater than a level-one threshold;

determining, in response to overall quality scores of n consecutive frames of face images being less than the level-one threshold, whether an overall quality score and a quality attribution score of a second face image meet a condition, wherein the second face image is a face image with a highest overall quality score among the n consecutive frames of face images, the quality attribution score comprises a plurality of dimensional quality scores in a plurality of quality reference dimensions, the overall quality score and the quality attribution score of the second face image meet the condition when the overall quality score of the second face image is greater than a level-two threshold and each of the plurality of dimensional quality scores of the quality attribution score of the second face image individually meets a respective threshold condition, the level-two threshold is less than the level-one threshold, n is a positive integer greater than 1; and transmitting the second face image to the face recognition process in response to the overall quality score and the quality attribution score of the second face image meeting the condition.

12. A non-transitory computer-readable storage medium, storing at least one instruction, at least one program, a code set, or an instruction set, the at least one instruction, the at least one program, the code set, or the instruction set being loaded and executed by a processor to implement a method for selecting a face image comprising:

obtaining a training sample comprising a sample face image and a standard face image corresponding to the sample face image;

training a first scoring model based on a degree of similarity between the sample face image and the standard face image, wherein calculating the degree of similarity comprises calculating a distance between a feature vector of the sample face image and a feature vector of the standard face image;

obtaining, after a frame of a first face image is obtained, a light score of the face image, the light score representing a brightness degree of the face image;

detecting, according to the light score of the face image, whether the face image meets a preliminary quality screening condition based on a comparison of the light score to a light score threshold, the light score threshold being determined based on an automatic exposure parameter and at least one of a parameter of an image acquisition device or an environmental parameter;

determining, in response to a first face image meeting the preliminary quality screening condition, that an automatic exposure adjustment process of the image acquisition device has ended, and an overall quality score of the first face image, the overall quality score representing overall quality of the face image, the overall quality score being determined using the first scoring model, the first scoring model being a neural network model configured to determine the overall quality score;

transmitting the first face image to a face recognition process in response to the overall quality score of the first face image being greater than a level-one threshold;

determining, in response to overall quality scores of n consecutive frames of face images being less than the level-one threshold, whether an overall quality score and a quality attribution score of a second face image meet a condition, wherein the second face image is a face image with a highest overall quality score among the n consecutive frames of face images, the quality attribution score comprises a plurality of dimensional quality scores in a plurality of quality reference dimensions, the overall quality score and the quality attribution score of the second face image meet the condition when the overall quality score of the second face image is greater than a level-two threshold and each of the plurality of dimensional quality scores of the quality attribution score of the second face image individually meets a respective threshold condition, the level-two threshold is less than the level-one threshold, n is a positive integer greater than 1; and transmitting the second face image to the face recognition process in response to the overall quality score and the quality attribution score of the second face image meeting the condition.

13. The computer-readable storage medium according to claim 12, wherein the determining the overall quality score of the first face image comprises:

invoking the first scoring model.

14. The computer-readable storage medium according to claim 13, the method further comprising:

obtaining the degree of similarity between the sample face image and the standard face image, wherein the degree of similarity is used for determining first label information of the sample face image, the first label information is label information of the overall quality score, and the first scoring model is trained based on the first label information of the sample face image.

15. The computer-readable storage medium according to claim 12, wherein after the determining the overall quality score of the first face image, the method further comprises iterations of:

obtaining an overall quality score of a next frame of face image in response to the overall quality score of the first face image being less than the level-one threshold, wherein the next frame of face image is a next frame of the first face image;

transmitting the next frame of face image to the face recognition process in response to an overall quality score of the next frame of face image being greater than the level-one threshold; and in response to the overall quality score of the next frame of face image being less than the level-one threshold, obtaining an overall quality score of a next frame of face image again.

* * * * *